Dec. 15, 1953 W. S. PRAEG Re. 23,752

HOBBING MACHINE

Original Filed June 7, 1948 3 Sheets-Sheet 1

INVENTOR.
WALTER S. PRAEG
BY Whittemore Hulbert & Belknap
ATTORNEYS

Dec. 15, 1953 W. S. PRAEG Re. 23,752

HOBBING MACHINE

Original Filed June 7, 1948 3 Sheets-Sheet 2

INVENTOR.
WALTER S. PRAEG
BY Whittemore, Hulbert & Belknap
ATTORNEYS

Dec. 15, 1953 W. S. PRAEG Re. 23,752

HOBBING MACHINE

Original Filed June 7, 1948 3 Sheets-Sheet 3

INVENTOR.
WALTER S. PRAEG
BY Whittemore, Hulbert & Belknap
ATTORNEYS

Reissued Dec. 15, 1953

Re. 23,752

UNITED STATES PATENT OFFICE 23,752

HOBBING MACHINE

Walter S. Praeg, Detroit, Mich., assignor to National Broach & Machine Company, Detroit, Mich., a corporation of Michigan Original No. 2,528,242, dated October 31, 1950, Serial No. 31,421, June 7, 1948. Application for reissue October 15, 1951, Serial No. 251,264

9 Claims. (Cl. 90—4)

Matter enclosed in heavy brackets [ ] appears in the original patent but forms no part of this reissue specification; matter printed in italics indicates the additions made by reissue.

The present invention relates to a hobbing machine.

It is an object of the present invention to provide a hobbing machine characterized by sturdy construction, the economy with which it may be built, and the accuracy and ease of setup change for hobbing helical gears and spur gears.

It is a further object of the present invention to provide a hobbing machine including means responsive to relative traverse between the gear and hob for imparting a compensating relative rotation thereto.

It is a further object of the present invention to provide a hobbing machine in which angular adjustments may be made between the direction of the axes of the gear and hob and the direction of relative traverse between the gear and hob.

It is a feature of the present invention to provide a hobbing machine including interconnected drive means for rotating the hob and a work gear, independent means for effecting relative traverse between the hob and work gear, and compensating means automatically operable in response to relative traverse between the hob and work gear for compensating for such relative traverse.

Other objects and features of the invention will become apparent as the description proceeds, especially when taken in conjunction with the accompanying drawings, wherein.

Figure 5:
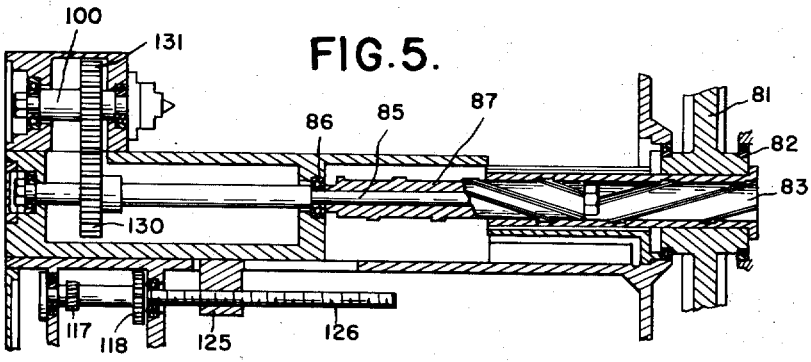
Figure 5 is a sectional view through the work spindle transmission of a simplified form of the machine.
Figure 1:
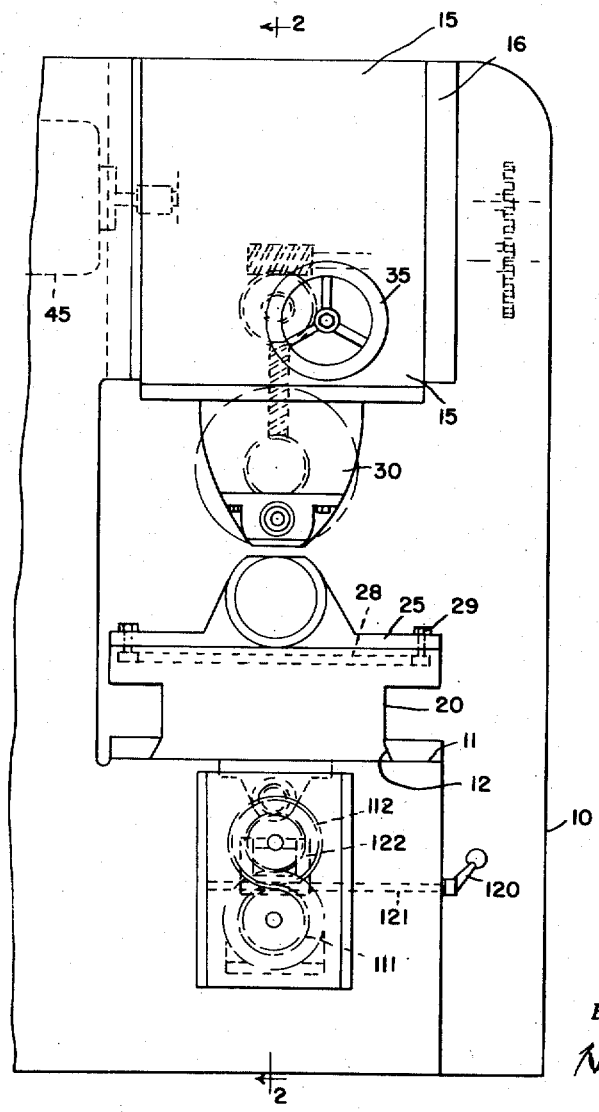
Figure 1 is a front elevation of a hobbing machine constructed in accordance with the present invention.

Hobbing machines generally are provided with means for driving the hob and the work gear and for effecting relative traverse between the hob and work gear all in definitely timed relation. Accordingly, it has been impossible to effect rapid return traverse after the hobbing cut has been taken or to substantially vary the hobbing speed. However, hobbing machines are known which include a differential in the train of gears driving the work gear, this differential including a gear driven in accordance with the rate of relative traverse between the gear and hob. Such differential hobs, however, are unduly complicated and expensive to manufacture, require involved computations when seeking changes in setup, and necessarily introduce inaccuracies in the finished gear as a result of a long train of driving gears which serve to introduce backlash.

In accordance with the present invention rotary drive to either the hob or the gear includes a rotating drive element having helical surfaces thereon and adapted to slide axially along a correspondingly formed element in accordance with relative traverse between the gear and hob. As the helical surfaces referred to may be of the same effective lead as the gear being hobbed, it will be apparent that relative traverse between the gear and hob may be at any rate desired and that completion of a rough hobbing stroke may be followed by rapid traverse to starting position followed by a relatively rapid finishing hobbing operation. The machine is designed to facilitate change-over by substitution of the parts providing the mating helical surfaces, and it is also contemplated that the parts having the mating helical surfaces need not be changed but that change gears may be introduced into the train so as to compensate for gears of different helix angles.

Referring now to the drawings the hobbing machine is illustrated as a horizontal spindle machine in which relative traverse between the hob spindle and the work spindle takes place in a horizontal plane. It will be appreciated, however, that the only important consideration is to maintain relative motions between the hob spindle and the gear spindle constant.

Figure 4:
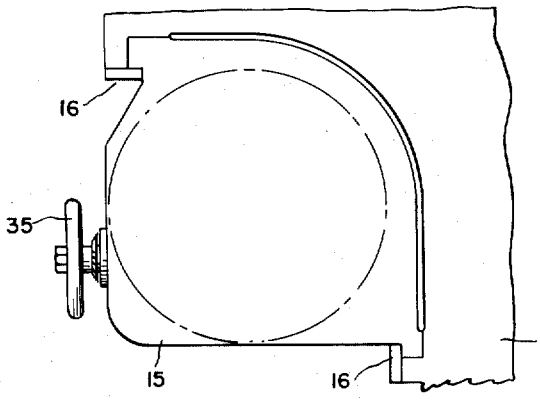
Figure 4 is a fragmentary plan view.

As best seen in Figures 1–4, the hobbing machine comprises a main frame or casting 10 providing a horizontal bed 11 having ways indicated at 12 formed thereon. Overlying the bed 12 is a vertically adjustable hob slide 15 which is mounted in ways indicated at 16 on the frame 10. As best seen in Figure 4 the hob slide 15 is located at a corner of the frame 10 so that access to the space between the hob slide 15 and the bed 11 is provided at two adjacent sides of the machine. This construction contributes to the rigidity of the parts and hence to the accuracy of the finished gears. At the same time, it affords convenient access to the manually adjustable parts as will subsequently be described.

Figure 2:
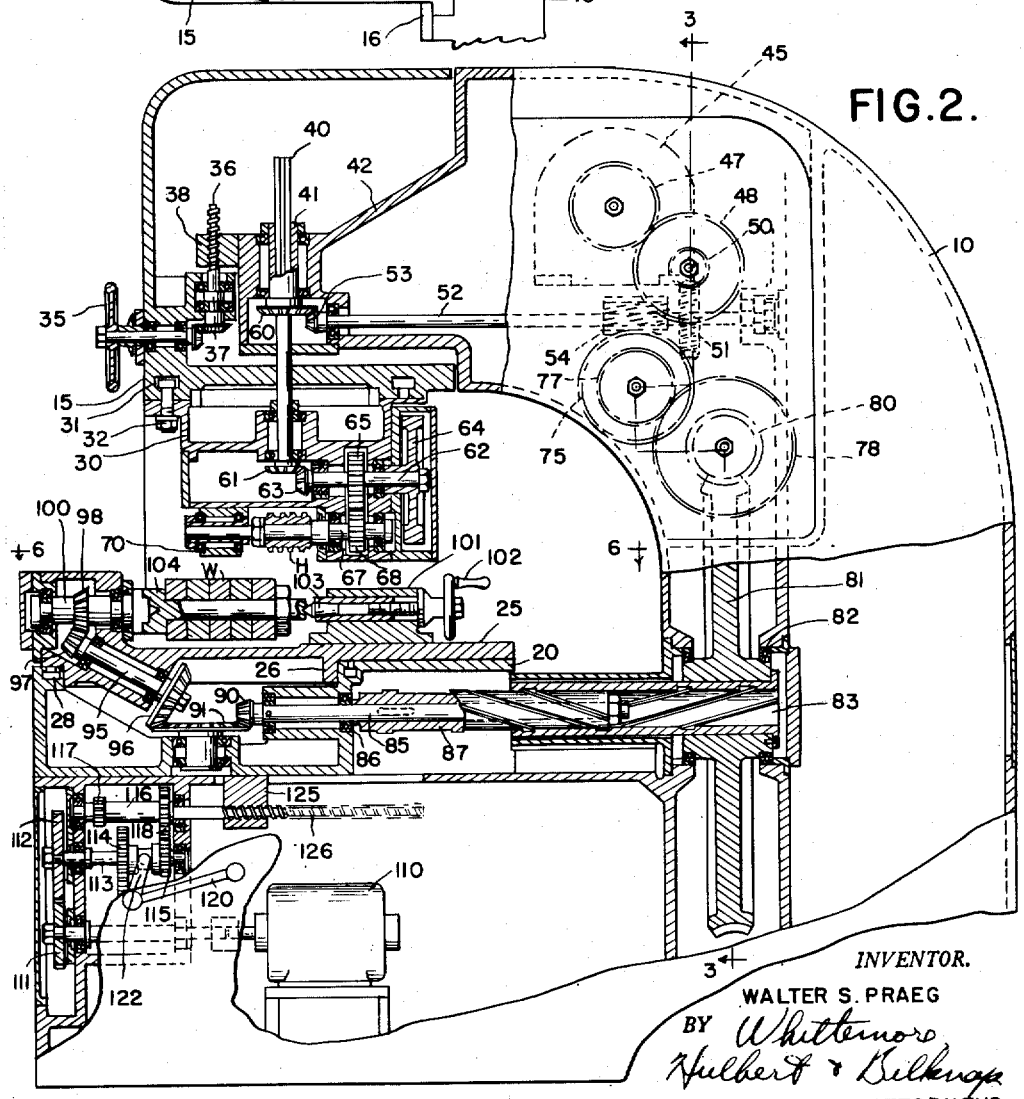
Figure 2 is an enlarged fragmentary section on the line 2—2 of Figure 1.
Figure 6:
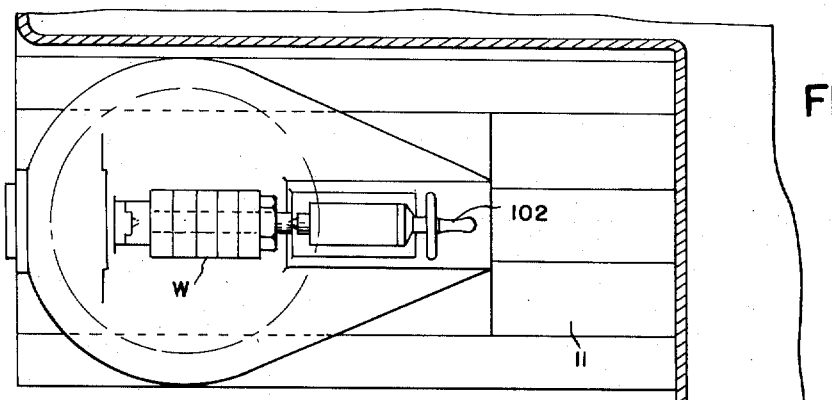
Figure 6 is a fragmentary section on the line 6—6 of Figure 2.
Figure 3:
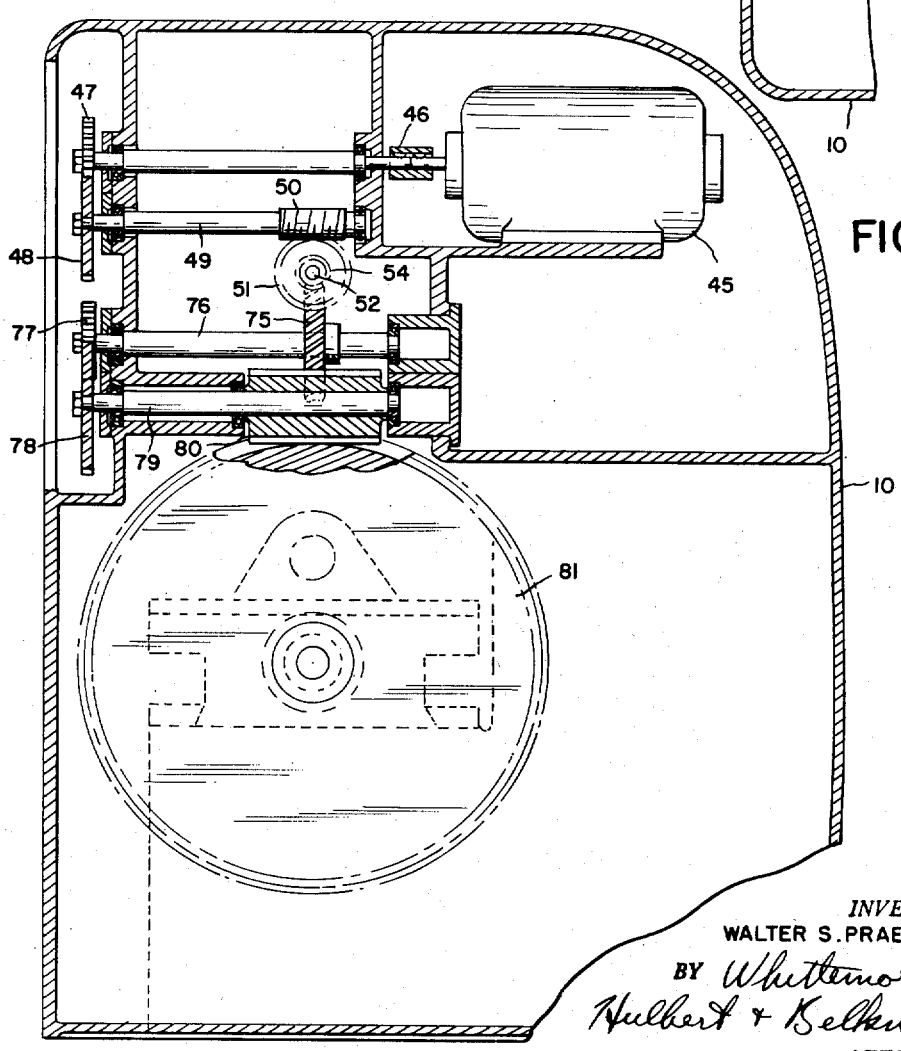
Figure 3 is a section on the line 3—3 of Figure 2.

Mounted for traverse in the ways 12 is a work carriage 20, upon which a work support 25 is mounted for angular adjustment about a vertical axis. The work support 25, as best seen in Figure 2, includes a depending circular portion 26 received within a correspondingly shaped opening formed in the top of the work slide 20 to guide the work support 25 in its angular adjustment. Circular T slots indicated at 28 are provided to which clamping bolts 29 are seated, so that the work support 25 may be locked in angularly adjusted position with respect to the work carriage 20.

In like manner, a hob support 30 is secured to the hob slide 15 in angularly adjustable relation with respect thereto. A circular T slot 31 is provided which cooperates with clamping bolts 32 so that the hob support 30 may be locked in angularly adjusted position.

The hob slide 15, as previously noted is vertically adjustable in the ways 16 and to effect this vertical adjustment a handwheel 35 is provided which drives a vertical adjusting screw 36 through bevel gearing indicated generally at 37. The screw 36 is received in a threaded block 38 rigidly secured to the upper portion of the frame 10, so that rotation of the handwheel 35 effects vertical adjustment of the hob slide 15 as will be readily apparent. In order to permit the vertical adjustment of the hob to be made without affecting the drive gearing for the hob, this gearing includes a vertically extended splined shaft 40 which is slidable in a splined sleeve 41 mounted in a forwardly extending portion 42 of the frame 10.

Means are provided for effecting rotation of hob and work spindles in timed relation, and in the present machine this mechanism is employed to rotate the hob and work spindles at the relative rates which would be appropriate for gearing having the same number of teeth as the hob and work gear. In other words, no change in relative speed of rotation of the hob and work spindles is provided for in this driving mechanism to compensate for relative traverse, this compensation being introduced by independent mechanism as will subsequently be described. The drive mechanism comprises a motor 45 carried in the hollow upper portion of the frame 10 which is connected by a suitable coupling 46 to a gear 47. The gear 47 meshes with a gear 48 mounted on a shaft 49 which in turn carries a worm 50. The worm 50 meshes with a worm gear 51 which is mounted on a shaft 52. The shaft 52 carries a bevel gear 53 which eventually transmits rotation to the hob spindle and also carries a worm gear 54 which eventually transmits rotation to the work spindle. Thus the means for rotating the work and the hob spindles comprises trains of gearing which include a common gear member, this member being the worm 50. Accordingly, the relative rate of rotation of the work spindle and hob spindle is definitely timed and the rate of rotation may be altered by substituting change gearing for the gears 47, 48.

Referring first to the gear train for rotating the hob spindle the bevel gear 53 meshes with a bevel gear 60 provided on the sleeve 41, the bevel gear 60 transmitting rotation to the splined shaft 40 previously referred to. At the lower end of the splined shaft 40 is a bevel gear 61 which is coaxial with the axis of adjustment of the hob support 30. The angularly adjustable hob support 30 is provided with a shaft 62 carrying a bevel gear 63 meshing with the bevel gear 61, so that the meshed relationship of the bevel gears 61, 63 is maintained during angular adjustment of the hob support 30. At the outer end of the shaft 62 is a balance wheel 64 and intermediate of its length the shaft 62 is provided with a gear 65. The hob spindle is indicated at 67 and is provided with a gear 68 meshing with the gear 65. Preferably the outer end of the hob spindle 67 is supported as by bearing means indicated at 70 and the spindle supports the hob H.

The mechanism for rotating the work spindle includes a worm gear 75 meshing with the worm 54 and mounted on a shaft 76 which carries a first change gear 77. A second change gear 78 mounted on the shaft 79 is provided and the shaft 79 carries a driving worm 80 which drives a large worm gear 81. The worm gear 81 is mounted in bearings indicated at 82 and has keyed or otherwise secured thereto an internally helically splined sleeve 83 which extends parallel to the ways 12 provided on the bed 11. The work carriage 20 is provided with a shaft 85 mounted in suitable bearings indicated at 86, the shaft 85 having keyed or otherwise secured thereto an externally helically splined member 87 which is slidably received within the internally helically splined sleeve 83.

At its end the shaft 85 is provided with a bevel gear 90 which meshes with a bevel gear 91 mounted on the work carriage 20. The bevel gear 91 is disposed with its axis extended vertically and coaxial with the axis of adjustment of the work support 25 relative to the work carriage 20.

The angularly adjustable work support 25 is provided with a short shaft 95 carrying a first bevel gear 96 which meshes with the bevel gear 91 and carrying at its opposite end a second bevel gear 97 meshing with a bevel gear 98 carried by the work spindle 100. The arrangement is such that the driving relationship is maintained to the work spindle while the work support 25 is angularly adjusted about a vertical axis. A tail stock indicated at 101 is provided including a handwheel 102 and a center 103 for engaging work supporting means such as the arbor 104 on which the work W is mounted From the mechanism just described, it will be apparent that traverse of the work carriage 20 on the bed 11 will superimpose a compensating rotation upon the rotation of the work piece W in accordance with the lead of the splined members 83, 87.

Means entirely independent from the mechanism for rotating the work and hob spindles is provided for effecting relative traverse of the work carriage 20. This means comprises a motor 110 carried in the base 10 which drives change gears 111 and 112 and hence the shaft 113. Keyed on the shaft 113 for axial sliding movement thereon is a speed change gear comprising a relatively large gear 114 and a relatively small gear 115. Parallel to the shaft 113 is the traverse shaft 116 on which is secured a relatively small gear 117 and a relatively large gear 118. A shifting lever 120 is provided for shifting the gears 114 and 115 longitudinally on the shaft 113 so that the relatively small gear 115 may mesh with the relatively large gear 118 or alternatively the relatively large gear 114 may mesh with the relatively small gear 117. The lever 120 is connected to a shaft 121 which carries a shifter fork 122 which engages an annular groove provided between the gears 114 and 115. This permits a substantial change of speed by shifting the lever 120 as will be readily apparent.

Depending from the underside of the work carriage 20 is a traverse nut 125 in which is received the traverse screw 126 provided as an extension of the traverse shaft 116. The motor 110 causes traverse of the carriage 20 through the gearing described above and the traverse nut and screw. The rate of traverse may be varied by the gear shifting mechanism described above. Suitable means (not shown) are provided for reversing the motor 110 to effect return means for effecting traverse on the carriage 20. It will be observed that the traverse of the carriage 20 by the motor 110 is entirely independent of the means for effecting relative timed rotation of the hob and work spindles by the motor 45, but that this traverse introduces a compensating rotation to the work spindle 110 by virtue of the helical splined relationship of the members 83 and 87. This permits traverse to be carried out at different rates and specifically will permit the hobbing operation to be carried out at a desired slow rate, after which return traverse to initial position may be carried out rapidly.

In the specific embodiment of the hobbing machine illustrated relative traverse is in a fixed horizontal direction as is determined by the location of the ways 12. However, both the work spindle and the hob spindle are independently angularly adjustable about a vertical axis so that the direction of relative traverse between the spindles may be at any desired angle with respect thereto. This permits the employment of a method of hobbing which I refer to as "diagonal traverse." In the past the conventional method of hobbing has been to provide relative traverse between the work gear and the hob in a direction parallel to the axis of the work. By employing a relative traverse which extends at an oblique angle to the axes of both the work spindle and the hob spindle, it is possible to provide a hobbing action which will produce accurately finished gears at a high rate of speed and with increased hob life, since the cutting action is distributed longitudinally over a predetermined portion of the hob during each hobbing stroke. This is to be contrasted with the prior conventional method in which for each setting of the hob the most severe cutting action was concentrated at a specific zone of the hob. In the past efforts have been made to overcome this difficulty which included provision for shifting the hob axially between hobbing operations or for providing an almost imperceptibly slow axial feed of the hob. The present machine obtains improved results over either of these two methods by automatically introducing a distribution of the wear longitudinally of the hob during each cutting cycle. In addition to the foregoing advantage the present hobbing machine permits a very accurate control of lead since with a single splined assembly made up of the parts 83 and 87, it is possible to produce slight variations in lead on the work gear by changing the angle between the direction of relative traverse and the axis of the work spindle. Thus while relatively large changes in relative speed between the hob and work piece will be made by substituting different sets of change gears for the gears 111, 112, such gears are not provided to take care of an infinite number of ratios. Thus a particular set of change gears may produce a ratio between the hob spindle and the work spindle which is not precisely that desired. This ratio may be modified by substituting different helically splined members for the members 83 and 87 and fine variations in lead may be accomplished by angular adjustments of the work support 25 and the hob support 30 relative to the direction of ways 12.

Reference is now made to Figure 5 which illustrates a simplification of the hobbing machine which may be made in the event that the feature of angular adjustability of the work support 25 is not required. In this case the shaft 85 instead of carrying the bevel gear 90 illustrated in Figure 2 is provided with a cylindrical gear 130 which meshes with a second cylindrical gear 131 mounted directly on the work spindle 106. In this case the bevel gears 90, 91, 96, 97 and 98 are not required, since there is no necessity for preserving continuity of a train of gears during angular adjustment of the work table.

The drawings and the foregoing specification constitute a description of the improved hobbing machine in such full, clear, concise and exact terms as to enable any person skilled in the art to practice the invention, the scope of which is indicated by the appended claims.

What I claim as my invention is:

1. A gear hobbing machine comprising a frame, having a bed thereon, a work carriage slidable on said bed, a hob support overlying said carriage and angularly adjustable about a vertical axis, a hob spindle on said hob support, gearing for rotating said hob spindle including a gear whose axis coincides with the axis of adjustment of said hob support to drive said hob spindle in all positions of angular adjustment, a work support angularly adjustable about a vertical axis on said carriage, a work spindle on said work support, gearing for rotating said work spindle including a gear whose axis coincides with the axis of adjustment of said work support to drive said work spindle in all positions of angular adjustment, said gearing including common drive means to effect timed rotation of said hob and work spindles, means independent of said gearing for effecting traverse of said carriage, and helically splined means in said work spindle gearing relatively axially slidable upon traverse of said carriage to superimpose a compensating rotation on said work spindle in accordance with traverse.

2. A gear hobbing machine comprising a frame, having a bed thereon, fixed ways on said bed, a work carriage slidable on said ways, a hob support overlying said carriage and angularly adjustable about a vertical axis, a hob spindle on said hob support, gearing for rotating said hob spindle including a gear whose axis coincides with the axis of adjustment of said hob support to drive said hob spindle in all positions of angular adjustment, a work support angularly adjustable about a vertical axis on said carriage, a work spindle on said work support, gearing for rotating said work spindle including a gear whose axis coincides with the axis of adjustment of said work spindle to drive said work spindle in all positions of angular adjustment, said gearing including common drive means to effect timed rotation of said hob and work spindles, means independent of said gearing for effecting traverse of said carriage on said ways, and helically splined means in said work spindle gearing relatively axially slidable upon traverse of said carriage to superimpose a compensating rotation on said work spindle in accordance with traverse.

3. In a hobbing machine including a hob spindle and a work spindle and connected gear trains for rotating said spindles, a carriage mounting said work spindle for traverse in a direction which occupies a plane parallel to the axes of said spindles, said carriage carrying a helically splined gear included in the train for rotating the work spindle, a splined drive shaft parallel to the direction of traverse of said carriage, said gear being splined to said shaft and movable along said shaft as said carriage is traversed, change gears between said splined gear and said work spindle to provide for hobbing gears of different helix angle with a single splined shaft and splined gear, and drive means independent of said gear trains for traversing said table.]

[4. A gear hobbing machine comprising a work carriage, a work spindle thereon, a hob support relatively adjustable toward and away from said carriage, a hob spindle on said support angularly adjustable thereon with respect to said work spindle, a motor, a train of driving gears interconnecting both of said spindles with said motor for driving said spindles, drive means independent of said motor for effecting traverse of said carriage in a plane parallel to the axes of said spindles, compensating means responsive to traverse of said carriage to superimpose an additional rotation of said work spindle upon the motor-driven rotation thereof in accordance with the lead of the work gear being hobbed and the rate of traverse of said carriage, said compensating means comprising a pair of helically splined members in the gear train connecting said work spindle with said motor, said splined members being relatively movable axially upon traverse of said carriage.]

[5. A gear hobbing machine comprising a work carriage, a work spindle thereon, a hob support relatively adjustable toward and away from said carriage, a hob spindle on said support angularly adjustable thereon with respect to said work spindle, a motor, a train of driving gears interconnecting both of said spindles with said motor for driving said spindles, drive means independent of said motor for effecting traverse of said carriage in a plane parallel to the axes of said spindles, compensating means responsive to traverse of said carriage to superimpose an additional rotation of said work spindle upon the motor-driven rotation thereof in accordance with the lead of the work gear being hobbed and the rate of traverse of said carriage, said compensating means comprising a pair of splined members in the gear train connecting said work spindle with said motor, said splined members being relatively movable axially upon traverse of said carriage, said splined member having a lead corresponding to the lead of the gears being hobbed.]

[6. A gear hobbing machine comprising a work carriage, a work spindle thereon, a hob support relatively adjustable toward and away from said carriage, a hob spindle on said support angularly adjustable thereon with respect to said work spindle, a motor, a train of driving gears interconnecting both of said spindles with said motor for driving said spindles, drive means independent of said motor for effecting traverse of said carriage in a plane parallel to the axes of said spindles, compensating means responsive to traverse of said carriage to superimpose an additional rotation of said work spindle upon the motor-driven rotation thereof in accordance with the lead of the work gear being hobbed and the rate of traverse of said carriage, said compensating means comprising a pair of splined members in the gear train connecting said work spindle with said motor, said splined members being relatively movable axially upon traverse of said carriage, said splined members having a lead equal to the lead of helix of the gears being hobbed.]

[7. A gear hobbing machine comprising a work carriage, a work spindle thereon, a hob support relatively adjustable toward and away from said carriage, a hob spindle on said support angularly adjustable thereon with respect to said work spindle, a motor, a train of driving gears interconnecting both of said spindles with said motor for driving said spindles, drive means independent of said motor for effecting traverse of said carriage in a plane parallel to the axes of said spindles, compensating means responsive to traverse of said carriage to superimpose an additional rotation of said work spindle upon the motor-driven rotation thereof in accordance with the lead of the work gear being hobbed and the rate of traverse of said carriage, said compensating means comprising a pair of splined members in the gear train connecting said work spindle with said motor, said splined members being relatively movable axially upon traverse of said carriage, and change gears in said gear train whereby gears of different lead may be hobbed with the same splined member and gear.]

8. A gear hobbing machine, comprising a work carriage, a work spindle thereon, a hob support relatively adjustable toward and away from said carriage, a hob spindle on said support angularly adjustable thereon with respect to said work spindle, a motor, a train of driving gears interconnecting both of said spindles with said motor for driving said spindles, drive means independent of said motor for effecting traverse of said carriage in a plane parallel to the axes of said spindles, compensating means responsive to traverse of said carriage to superimpose an additional rotation of said work spindle upon the motor-driven rotation thereof in accordance with the lead of the work gear being hobbed and the rate of traverse of said carriage, said compensating means comprising a rotary shaft in the gear train connecting said work spindle with said motor, an externally splined sleeve removably mounted on said shaft, and a removable, internally splined sleeve on said externally splined sleeve, said splined sleeves being relatively axially movable upon traverse of said carriage.

9. A gear hobbing machine comprising a frame, a carriage slidable on said frame, a work spindle on said carriage, a tool spindle on said frame, drive means for said spindles comprising a motor and gearing connecting said motor to each of said spindles, master lead control compensating means in the gearing connecting said motor and said work spindle comprising a pair of coaxial helically splined members relatively axially slidable upon sliding movement of said carriage, and feeding means for traversing said carriage, *said work spindle and tool spindle being independently angularly adjustable about an axis perpendicular to both of said spindles.*

[10. A gear hobbing machine as defined in claim 9 in which said feeding means comprises a separate motor and feed screw mechanism between said frame and carriage.]

[11. A gear hobbing machine as defined in claim 9 in which said work spindle is parallel to the direction of traverse of said carriage.]

[12. A gear hobbing machine as defined in claim 11 in which said tool spindle is mounted for angular adjustment about an axis perpendicular to the axes of both of said spindles.]

[13. A gear hobbing machine as defined in claim 9 in which said tool spindle and said work spindle are each independently adjustable about an axis perpedicular to both of said spindles.]

14. A gear hobbing machine for machining the teeth of gears comprising a frame, a carriage slidable on said frame, a work spindle on said carriage, a tool spindle on said frame for a worm-like tool, means mounting said tool spindle for angular adjustment about an axis perpendicular to the axes of both of said spindles to bring a worm-like hobbing tool and work piece into a crossed and non-parallel operating relationship equivalent to the meshing relationship of a worm and worm gear, drive means for said spindles comprising a motor and gearing connecting said motor to both of said spindles, said gearing being effective to rotate said spindles in the timed relationship proper for meshed rotation of a worm and worm gear having the same number of teeth as the tool and work piece, feeding means for traversing said carriage in a direction to cause the action of the tool to progress from one side to the other of the work piece, and master lead control compensating means comprising a pair of coaxial helically splined members included in the gearing connecting said motor with said work spindle, said members being relatively axially slidable upon feeding traverse of said carriage, *said work spindle being mounted for angular adjustment in a plane containing its axis and parallel to the direction of traverse of said carriage and parallel to said tool spindle.*

[15. A gear hobbing machine as defined in claim 14 in which said work spindle is parallel to the direction of traverse of said carriage.]

[16. A gear hobbing machine as defined in claim 14 in which said work spindle is mounted for angular adjustment in the plane containing its axis and parallel to the direction of traverse of said carriage and parallel to said tool spindle.]

[17. A gear hobbing machine as defined in claim 14 in which said feeding means comprises a feed screw mechanism for traversing said carriage, and a separate motor drive for said mechanism.]

[18. A gear hobbing machine comprising a frame, a carriage mounted for horizontal sliding movement on said frame, a work spindle on said carriage having its axis parallel to the direction of traverse of said carriage, a tool spindle overhanging said carriage, means mounting said tool spindle for angular adjustment in a horizontal plane, drive means for said spindles comprising a motor and gearing connecting said motor to both of said spindles, feeding means for traversing said carriage, and master lead control compensating means comprising a pair of coaxial helically splined members in the gearing connecting said motor to said work spindle, said members being relatively axially slidable upon traverse of said carriage.]

[19. A gear hobbing machine as defined in claim 18 in which said splined members are located in said gearing closely adjacent to said work spindle.]

[20. A gear hobbing machine as defined in claim 18 in which said feeding means comprises a feed screw mechanism, and means for changing the speed of said feeding means independent of the geared rotation of said spindles.]

[21. A gear hobbing machine as defined in claim 18 in which said feeding means comprises a separate motor and feed screw mechanism between said frame and carriage.]

[22. A gear hobbing machine comprising a frame, a work carriage slidable on said frame, a work spindle on said carriage, a hob spindle on said frame, a motor, driving gears interconnecting both of said spindles with said motor including a separate train of gears for driving each of said spindles in definitely timed geared rotation, feed means for effecting traverse of said carriage, the train of gears for driving said work spindle including a worm and worm gear in which the worm drives the worm gear, said worm and worm gear being located in the gear train relatively close to the work spindle, master lead compensating means responsive to traverse of said carriage to superimpose an additional rotation on said work spindle upon the geared rotation thereof in accordance with the lead of the work gear being hobbed and the rate of traverse of said carriage, said compensating means comprising a pair of coaxial helically splined members in the gear train for driving the work spindle and located therein intermediate said worm and worm gear and said work spindle, said splined members being relatively slidable axially upon traverse of said carriage.]

[23. A gear hobbing machine as defined in claim 22 in which said work spindle and said helically splined members are parallel to the direction of traverse of said carriage.]

[24. A gear hobbing machine as defined in claim 23 in which the means for effecting traverse of the carriage comprises a separate motor and feed screw mechanism.]

*25. A gear hobbing machine comprising a rotary hob spindle, a rotary work spindle, rotary drive means comprising a motor, gear trains connecting said motor to both of said spindles, the gear train driving said work spindle including a worm driving a worm gear, traverse mechanism independent of said rotary drive means for traversing said work spindle in a direction parallel to its axis, and lead compensating mechanism comprising an internal helically splined sleeve secured to said worm gear, and an externally helically splined member slidably received in said sleeve, said member being included in the gear train driving said work spindle, and being axially movable relative to said sleeve upon traverse of said work spindle.*

*26. A gear hobbing machine comprising a frame, a work carriage slidable on said frame, a work spindle on said carriage, a hob spindle on said frame, a motor, driving gears interconnecting both of said spindles with said motor including a separate train of gears for driving each of said spindles in definitely timed geared relation, feed means comprising a separate motor and feed screw mechanism for effecting traverse of said carriage, the train of gears for driving said work spindle including a worm and worm gear in which the worm drives the worm gear, said worm and worm gear being located in the gear train relatively close to the work spindle, master lead compensating means responsive to traverse of said carriage to superimpose an additional rotation on said work spindle upon the geared rotation thereof in accordance with the lead of the work gear being hobbed and the rate of traverse of said carriage, said compensating means comprising a pair of coaxial helically splined members in the gear train for driving the work spindle and located therein intermediate said worm and worm gear and said work spindle and parallel to the direction of traverse of said carriage, said splined members being relatively slidable axially upon traverse of said carriage.*

*27. A hobbing machine comprising a rotary hob*

*spindle, a rotary work spindle, means supporting both of said spindles for independent angular adjustment about axes perpendicular to both of said spindles, rotary drive means for both of said spindles comprising a motor and gear trains connecting said motor to said spindles, a worm driving a worm gear in the gear train driving said work spindle, lead compensating mechanism driven by said worm gear in said last mentioned gear train, said mechanism comprising a pair of helically splined coaxial members, traverse means independent of said rotary drive means for effecting traverse of said work spindle in a direction parallel to the axes of said members, one of said splined members being mounted for rotation in fixed position relative to said worm gear, said other splined member being operatively connected to said work spindle for axial movement upon traverse of said work spindle, and being slidably engaged with said one splined member.*

*28. A machine as defined in claim 27 in which said traverse means includes a slow feed for cutting gears and a rapid return traverse, and means for selectively rendering said slow feed and rapid return traverse effective.*

WALTER S. PRAEG.

References Cited in the file of this patent or the original patent

UNITED STATES PATENTS

| Number | Name | Date |
|---|---|---|
| 1,037,571 | Zimmermann | Sept. 3, 1912 |
| 1,049,350 | Fawcus | Jan. 7, 1913 |
| 1,082,533 | Lees | Dec. 30, 1913 |
| 1,103,851 | Sykes | July 14, 1914 |
| 2,048,503 | Hawgood | July 21, 1936 |

FOREIGN PATENTS

| Number | Country | Date |
|---|---|---|
| 480,247 | Great Britain | Feb. 14, 1938 |